(12) United States Patent
Balakrishnan et al.

(10) Patent No.: US 7,974,112 B2
(45) Date of Patent: *Jul. 5, 2011

(54) OFF-LINE CONVERTER WITH DIGITAL CONTROL

(75) Inventors: Balu Balakrishnan, Saratoga, CA (US); Alex B. Djenguerian, Saratoga, CA (US); Leif O. Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/330,277

(22) Filed: Dec. 8, 2008

(65) Prior Publication Data

US 2009/0091309 A1 Apr. 9, 2009

Related U.S. Application Data

(60) Continuation of application No. 11/824,425, filed on Jun. 28, 2007, now Pat. No. 7,477,534, which is a continuation of application No. 11/389,184, filed on Mar. 24, 2006, now Pat. No. 7,248,029, which is a continuation of application No. 11/066,026, filed on Feb. 25, 2005, now Pat. No. 7,038,439, which is a continuation of application No. 10/805,661, filed on Mar. 18, 2004, now Pat. No. 6,876,181, which is a continuation of application No. 10/438,207, filed on May 13, 2003, now Pat. No. 6,747,444, which is a continuation of application No. 10/092,705, filed on Mar. 6, 2002, now Pat. No. 6,608,471, which is a continuation of application No. 09/927,273, filed on Aug. 10, 2001, now Pat. No. 6,414,471, which is a continuation of application No. 09/630,477, filed on Aug. 2, 2000, now Pat. No. 6,297,623, which is a division of application No. 09/032,520, filed on Feb. 27, 1998, now Pat. No. 6,226,190.

(51) Int. Cl.
   *H02M 3/335* (2006.01)
(52) U.S. Cl. ......................................... 363/97; 323/284
(58) Field of Classification Search .................. 323/282, 323/283, 284, 285; 363/16, 18, 19, 20, 97, 363/131; 327/344
   See application file for complete search history.

(56) References Cited

U.S. PATENT DOCUMENTS 3,491,252 A     1/1970  Petrohilos
(Continued)

FOREIGN PATENT DOCUMENTS

CN            1016920 B      6/1992
(Continued)

OTHER PUBLICATIONS

Bowen, A.J. et al., "Power Supply with Optical Isolator," IBM Technical Disclosure Bulletin, vol. 14, No. 11, Apr. 1972, p. 3220.
(Continued)

*Primary Examiner* — Jessica Han
(74) *Attorney, Agent, or Firm* — Blakely Sokoloff Taylor & Zafman LLP

(57) ABSTRACT

A regulation circuit for use in DC to DC converter is disclosed. One such regulation circuit includes a feedback circuit to be coupled an energy transfer element output to receive a feedback signal to indicate whether the energy transfer element output is above or below a threshold level. A control circuit is included that is to be coupled to a switch that is coupled to an energy transfer element input. The control circuit is further coupled to the feedback circuit to generate a drive signal to control the switch to regulate the energy transfer element output to approximately the threshold level. The control circuit is to maintain an on-time of a current cycle of the drive signal and not allow an on-time of a next cycle of the drive signal in response to the energy transfer element output rising above the threshold level.

7 Claims, 14 Drawing Sheets

U.S. PATENT DOCUMENTS

| | | | |
|---|---|---|---|
| 3,555,399 A | 1/1971 | Buchanan et al. | |
| 3,629,622 A | 12/1971 | Denenberg, Jr. | |
| 3,840,797 A | 10/1974 | Aggen et al. | |
| 3,916,224 A | 10/1975 | Daniels et al. | |
| 3,978,393 A | 8/1976 | Wisner et al. | |
| 4,058,758 A | 11/1977 | Peterson | |
| 4,072,965 A | 2/1978 | Kondo | |
| 4,143,282 A | 3/1979 | Berard, Jr. et al. | |
| 4,151,387 A | 4/1979 | Peters, Jr. | |
| 4,228,493 A | 10/1980 | de Sartre et al. | |
| 4,236,198 A | 11/1980 | Ohsawa et al. | |
| 4,353,113 A | 10/1982 | Billings | |
| 4,378,585 A | 3/1983 | Bete | |
| 4,400,767 A | 8/1983 | Fenter | |
| 4,481,564 A | 11/1984 | Balaban | |
| 4,495,554 A | 1/1985 | Simi et al. | |
| 4,533,986 A | 8/1985 | Jones | |
| 4,559,590 A | 12/1985 | Davidson | |
| 4,573,112 A | 2/1986 | Numata et al. | |
| 4,622,627 A | 11/1986 | Rodriguez et al. | |
| 4,695,742 A | 9/1987 | Randall | |
| 4,695,936 A | 9/1987 | Whittle | |
| 4,706,176 A | 11/1987 | Kettschau | |
| 4,706,177 A | 11/1987 | Josephson | |
| 4,720,641 A | 1/1988 | Faini | |
| 4,725,769 A | 2/1988 | Cini et al. | |
| 4,734,839 A | 3/1988 | Barthold | |
| 4,737,898 A | 4/1988 | Banfalvi | |
| 4,739,462 A | 4/1988 | Farnsworth et al. | |
| 4,761,724 A | 8/1988 | Brown et al. | |
| 4,791,544 A | 12/1988 | Gautherin et al. | |
| 4,800,323 A | 1/1989 | Sikora | |
| 4,806,844 A | 2/1989 | Claydon et al. | |
| 4,809,148 A | 2/1989 | Barn | |
| 4,811,184 A | 3/1989 | Koninsky et al. | |
| 4,814,674 A | 3/1989 | Hrassky | |
| 4,858,094 A | 8/1989 | Barlage | |
| 4,862,339 A | 8/1989 | Inou et al. | |
| 4,866,590 A | 9/1989 | Odaka et al. | |
| 4,870,555 A | 9/1989 | White | |
| 4,887,199 A | 12/1989 | Whittle | |
| 4,888,497 A | 12/1989 | Dallabora et al. | |
| 4,890,210 A | 12/1989 | Myers | |
| 4,928,220 A | 5/1990 | White | |
| 4,937,728 A | 6/1990 | Leonardi | |
| 4,942,508 A | 7/1990 | Nakamura | |
| 4,943,761 A | 7/1990 | Fox et al. | |
| 4,943,903 A | 7/1990 | Cardwell, Jr. | |
| 5,012,399 A | 4/1991 | Takemura et al. | |
| 5,012,401 A | 4/1991 | Barlage | |
| 5,013,998 A | 5/1991 | Varga et al. | |
| 5,014,178 A | 5/1991 | Balakrishnan | |
| 5,018,058 A | 5/1991 | Ionescu et al. | |
| 5,034,871 A | 7/1991 | Okamoto et al. | |
| 5,041,956 A | 8/1991 | Marinus | |
| 5,063,491 A | 11/1991 | Shigeo | |
| 5,072,353 A | 12/1991 | Feldtkeller | |
| 5,086,364 A | 2/1992 | Leipold et al. | |
| 5,140,513 A | 8/1992 | Yokoyama | |
| 5,146,394 A | 9/1992 | Ishii et al. | |
| 5,161,098 A | 11/1992 | Balakrishnan | |
| 5,177,408 A | 1/1993 | Marques | |
| 5,184,290 A | 2/1993 | Ozawa et al. | |
| 5,200,886 A | 4/1993 | Schwarz et al. | |
| 5,260,861 A | 11/1993 | Wert | |
| 5,289,101 A | 2/1994 | Furuta et al. | |
| 5,297,014 A | 3/1994 | Saito et al. | |
| 5,302,889 A | 4/1994 | Marsh | |
| 5,309,078 A | 5/1994 | Cameron | |
| 5,313,381 A | 5/1994 | Balakrishnan | |
| 5,321,349 A | 6/1994 | Chang | |
| 5,333,104 A | 7/1994 | Tamura et al. | |
| 5,394,017 A | 2/1995 | Catano et al. | |
| 5,408,173 A | 4/1995 | Knapp | |
| 5,414,340 A | 5/1995 | Gannon | |
| 5,434,768 A | 7/1995 | Jitaru et al. | |
| 5,452,195 A | 9/1995 | Lehr et al. | |
| 5,461,303 A | 10/1995 | Leman et al. | |
| 5,475,579 A | 12/1995 | John et al. | |
| 5,479,088 A | 12/1995 | Hayakawa et al. | |
| 5,481,178 A | 1/1996 | Wilcox et al. | |
| 5,488,552 A | 1/1996 | Sakamoto et al. | |
| 5,508,602 A | 4/1996 | Borgato et al. | |
| 5,528,131 A | 6/1996 | Marty et al. | |
| 5,552,746 A | 9/1996 | Danstrom | |
| 5,563,534 A | 10/1996 | Rossi et al. | |
| 5,568,084 A | 10/1996 | McClure et al. | |
| 5,570,057 A | 10/1996 | Palara | |
| 5,572,156 A | 11/1996 | Diazzi et al. | |
| 5,610,803 A | 3/1997 | Malik | |
| 5,617,016 A | 4/1997 | Borghi et al. | |
| 5,619,403 A | 4/1997 | Ishikawa et al. | |
| 5,621,629 A | 4/1997 | Hemminger et al. | |
| 5,625,279 A | 4/1997 | Rice et al. | |
| 5,631,810 A | 5/1997 | Takano | |
| 5,636,109 A | 6/1997 | Carroll | |
| 5,640,312 A | 6/1997 | Carroll | |
| 5,640,317 A | 6/1997 | Lei | |
| 5,675,485 A | 10/1997 | Seong | |
| 5,710,697 A | 1/1998 | Cooke et al. | |
| 5,729,448 A | 3/1998 | Haynie et al. | |
| 5,786,990 A | 7/1998 | Marrero | |
| 5,828,558 A | 10/1998 | Korcharz et al. | |
| 5,844,790 A | 12/1998 | Jacobs et al. | |
| 5,850,336 A | 12/1998 | Nakajima | |
| 5,949,226 A | 9/1999 | Tanaka et al. | |
| 5,966,004 A | 10/1999 | Kadanka | |
| 6,049,471 A | 4/2000 | Korcharz et al. | |
| 6,104,622 A | 8/2000 | Shin | |
| 6,108,183 A | 8/2000 | Beene | |
| 6,114,833 A | 9/2000 | Langston et al. | |
| 6,198,261 B1 | 3/2001 | Schultz et al. | |
| 6,208,533 B1 | 3/2001 | Ogawa | |
| 6,226,190 B1 | 5/2001 | Balakrishnan et al. | |
| 6,297,623 B1 | 10/2001 | Balakrishnan et al. | |
| 6,414,471 B1 | 7/2002 | Balakrishnan et al. | |
| 6,525,514 B1 | 2/2003 | Balakrishnan et al. | |
| 6,608,471 B2 | 8/2003 | Balakrishnan et al. | |
| 6,667,605 B2 | 12/2003 | Balakrishnan et al. | |
| 6,747,444 B2 | 6/2004 | Balakrishnan et al. | |
| 6,784,646 B2 | 8/2004 | Balakrishnan et al. | |
| 6,876,181 B1 | 4/2005 | Balakrishnan et al. | |
| 6,894,911 B2 | 5/2005 | Telefus et al. | |
| 6,900,622 B2 | 5/2005 | Balakrishnan et al. | |
| 6,900,995 B2 | 5/2005 | Muegge et al. | |
| 7,038,439 B2 | 5/2006 | Balakrishnan et al. | |
| 7,045,994 B2 | 5/2006 | Balakrishnan et al. | |
| 7,202,650 B2 | 4/2007 | Lipcsei et al. | |
| 7,211,991 B2 | 5/2007 | Balakrishnan et al. | |
| 7,214,910 B2 | 5/2007 | Chen et al. | |
| 7,248,029 B2 | 7/2007 | Balakrishnan et al. | |
| 7,400,122 B2 | 7/2008 | Balakrishnan et al. | |
| 7,477,534 B2 * | 1/2009 | Balakrishnan et al. | 363/97 |
| 7,521,908 B2 | 4/2009 | Balakrishnan et al. | |
| 7,538,535 B2 | 5/2009 | McDonald et al. | |
| 2002/0027786 A1 | 3/2002 | Nakazawa et al. | |
| 2002/0071295 A1 | 6/2002 | Nishikawa | |
| 2004/0017182 A1 | 1/2004 | Balakrishnan et al. | |
| 2004/0052448 A1 | 3/2004 | Griffin | |
| 2004/0071244 A1 | 4/2004 | Shaeffer | |
| 2004/0080962 A1 | 4/2004 | Charych | |
| 2005/0124303 A1 | 6/2005 | Bengtson et al. | |
| 2009/0091309 A1 | 4/2009 | Balakrishnan et al. | |

FOREIGN PATENT DOCUMENTS

| | | |
|---|---|---|
| EP | 0 651 440 A1 | 5/1995 |
| EP | 0 694 966 A1 | 1/1996 |
| EP | 0 736 957 A1 | 10/1996 |
| EP | 0 740 491 A1 | 10/1996 |
| EP | 0 748 034 A1 | 12/1996 |
| EP | 0 748 035 A1 | 12/1996 |
| EP | 0 751 621 A1 | 1/1997 |
| EP | 0 875 983 A3 | 10/2000 |
| EP | 1 179 884 A2 | 2/2002 |
| JP | 02-262868 | 10/1990 |
| JP | 03-022862 | 1/1991 |

| JP | 03-050979 | 3/1991 |
| JP | 2000-217352 | 8/2000 |
| WO | WO 83/01157 | 3/1983 |

OTHER PUBLICATIONS

Hoffman, Jr., H.S., "Self-Generated Bias Supply," IBM Technical Disclosure Bulletin, vol. 20, No. 5, Oct. 1977, pp. 1814-1815.

Halperin, A., "Primary Regulated Dual Power Supply," IBM Technical Disclosure Bulletin, vol. 21, No. 10, Mar. 1979, pp. 4299-4300.

Hoffman, Jr., H.S. et al., "Proportional Drive Supply with Diversion Control," IBM Technical Disclosure Bulletin, vol. 21, No. 12, May 1979, pp. 4904-4905.

Azzis, D. et al., "Flyback on Card Power Supply," IBM Technical Disclosure Bulletin, vol. 23, No. 4, Sep. 1980, pp. 1477-1478.

Bruckner, R. et al., "Optimizing Converter Design and Performance Utilizing Micro Controller System Feedback and Control," Proceedings of Powercon 8, E-2, 1981, pp. 1-10.

Pelly, B. et al., "Power MOSFETs Take the Load Off Switching Supply Design," Electronic Design, Feb. 1983, pp. 135-139.

Riezenman, M., "5-W DC-DC Converters Aim at Telecomm Applications," Electronic Design, Jul. 1983, p. 227.

"Combined Switch-Mode Power Amplifier and Supply," IBM Technical Disclosure Bulletin, vol. 28, No. 3, Aug. 1985, pp. 1193-1195.

"Off-Line Power Supply Control Technique Using A Single Transformer To Feed Back Three Control Signals," IBM Technical Disclosure Bulletin, vol. 32, No. 8A, Jan. 1990, pp. 272-274.

"TNY253/254/255—TinySwitch™ Family Energy Efficient, Low Power Off-line Switchers," Power Integrations, Inc., Jun. 1998, pp. 1-16.

EP 01 30 6615: EP Search Report, dated Aug. 1, 2002 (Publication No. EP 1 179 884).

European Search Report with Communication, European Patent Application No. 06253525.7; official communication dated Jan. 30, 2009, Search Report dated Jan. 23, 2009.

First Chinese Office Action dated Jun. 5, 2009, Chinese Application No. 200610125658.0, filed Aug. 25, 2006.

* cited by examiner

OFF-LINE CONVERTER WITH DIGITAL CONTROL

REFERENCE TO RELATED APPLICATIONS

This application is a continuation of and claims priority to U.S. application Ser. No. 11/824,425, filed Jun. 28, 2007, now pending, which is a continuation of U.S. application Ser. No. 11/389,184, filed Mar. 24, 2006, now U.S. Pat. No. 7,248,029 B2, which is a continuation of U.S. application Ser. No. 11/066,026, filed Feb. 25, 2005, now U.S. Pat. No. 7,038,439 B2, which is a continuation of U.S. application Ser. No. 10/805,661, filed Mar. 18, 2004, now U.S. Pat. No. 6,876,181 B1, which is a continuation of U.S. application Ser. No. 10/438,207, filed May 13, 2003, now U.S. Pat. No. 6,747,444 B2, which is a continuation of U.S. application Ser. No. 10/092,705, filed Mar. 6, 2002, now U.S. Pat. No. 6,608,471 B2, which is continuation of U.S. application Ser. No. 09/927,273, filed Aug. 10, 2001, now U.S. Pat. No. 6,414,471 B1, which is a continuation of U.S. application Ser. No. 09/630,477, filed Aug. 2, 2000, now U.S. Pat. No. 6,297,623 B1, which is a divisional of U.S. application Ser. No. 09/032,520, filed Feb. 27, 1998, now U.S. Pat. No. 6,226,190 B1.

BACKGROUND

1. Field of the Invention

The present inventions pertain to the field of power supplies, and among other things to the regulation of power supplies.

2. Background

Accurate regulation of power supplies is important in many areas. For instance in sensitive electronic devices such as computers and televisions maintaining a constant power supply is important for the operation of the computer or television. Additionally, the advantages of accurate power supply regulation include reduced overall power consumption and reduced damage to equipment by preventing voltage spikes during start up and operation.

Power supplies are regulated by keeping either a current or voltage delivered to a load within a specified range. A power supply is deemed to be in regulation if the load current or voltage is within the specified range and is deemed to be out of regulation if the load current or voltage is outside the specified range.

Problems associated with out of regulation conditions include damage to the load, improper load functioning, and the consumption of power when no power is necessary to operate the load. Therefore, power supplies that regulate output power provided to the load are desired.

A known regulated power supply is depicted in FIG. 1. The regulated power supply of FIG. 1 includes an EMI filter 10 that receives an AC mains voltage. The output of the EMI filter 10 is coupled to rectifier 15 that rectifies the AC mains voltage and then provides the rectified voltage to capacitor 20. Capacitor 20 provides a substantially DC voltage to a primary winding 25 of transformer 30.

A monolithic power supply control chip 40 includes a MOSFET 45 that is controlled by pulse width modulator 50. When MOSFET 45 is conducting, primary winding 25 has current flowing through it allowing transformer 30 to store energy. When MOSFET 45 is not conducting, the energy stored in the transformer 30 induces a voltage across the secondary winding 55 which is transferred to a load 60 connected at output terminals 65. A capacitor 70 is coupled to secondary winding 55 in order to maintain the voltage that is being supplied to the load 60 when MOSFET 45 is on.

A feedback circuit 75 is coupled to the load 60. The feedback circuit 75 includes a resistor 80, zener diode 85 and an optocoupler 90. A bias winding 95 is magnetically coupled to primary winding 25 and is used to supply power to the output of the optocoupler 90. When the voltage at load 60 is above combination of the reverse bias voltage of zener diode 85 and the forward voltage drop of light emitting diode 100, a current is generated in the phototransistor 105 by light emitting diode 100. The phototransistor 105 current flows from the bias winding 95 to the control terminal 110 of monolithic power supply control chip 40. The current provided to the control terminal 110 of monolithic power supply control chip 40 controls the duty cycle of MOSFET 45. When the control terminal 110 current increases the duty cycle of MOSFET 45 decreases and the amount of current through primary winding 25 decreases. Therefore, the power provided to the load 60 decreases. As the power supplied to the load 60 decreases, the load voltage decreases which in turn reduces the optocoupler 90 current increasing the duty cycle of MOSFET 45. Thus, the output voltage is regulated at a voltage equal to zener 85 reverse breakdown voltage plus the forward drop of LED 100 in an analog closed loop. Resistor 80 controls the gain of the analog loop.

It should be noted that pulse width modulator 50 is switching at some duty cycle to provide power to the feedback circuit 75 even when there is no load connected to the output terminals 65. This will cause power consumption from switching losses occurring at the operating frequency of the MOSFET 45.

The regulated power supply of FIG. 1 is able to maintain the voltage at the load at a reasonably constant level, while reducing voltage transients due to load and line variations.

However, the addition of a feedback winding and pulse width modulation controller makes application of the regulated power supply of FIG. 1 expensive for many power suppliers operating at low powers, especially those below five (5) watts. Additionally, the use of analog pulse width modulation feedback control requires compensation circuitry to stabilize the circuit and to prevent oscillations. The compensation circuit limits the bandwidth of the control loop to one (1) or two (2) kilohertz. The Pulse Width Modulated feedback circuit while effective at regulating the voltage still has time periods when the voltage is above and below the desired level, because of the limited bandwidth of the feedback loop which is in the range of one (1) or two (2) kilohertz even though the switching frequency of the MOSFET 45 may be as high as one hundred (100) kilohertz.

It is therefore desired to create a power supply that is cost effective for low power solutions.

It is further desired to create a power supply that utilizes the minimum amount of components possible.

It is additionally desired to create a power supply that can respond quickly to load transients without losing output regulation.

SUMMARY OF THE INVENTION

A presently preferred DC to DC converter comprises an energy storage element that receives a first power level and that provides a second power level, a feedback circuit coupled to the energy storage element, and a regulator circuit coupled to the feedback circuit and to the energy storage element. When a feedback signal is above a threshold the regulator circuit is disabled and when the feedback signal is below said threshold level the regulator circuit is enabled.

In another embodiment a power supply comprises a transforming element that transfers energy and is coupled to receive a first power level and a regulator circuit coupled to the transforming element. The regulator circuit controlling input of the first power level to the transforming element. When an output voltage or current of the transforming element is above a threshold level the regulator circuit is disabled and when output voltage or current of the transforming element is below a threshold level the regulator circuit operates.

In yet another embodiment a regulator circuit comprises a feedback input, a switch operating when a control signal is received at its control terminal, an oscillator that provides a duty cycle signal comprising a high state and a low state. The control signal is provided when no feedback signal is provided and the duty cycle signal is in said high state.

In a further embodiment a power supply comprises an energy storage element coupled to receive a first power level and a regulation circuit coupled between the energy storage element and a source of the first power level. The regulation circuit prevents the energy storage element from receiving the first power level when a current or voltage at the input of the energy storage element is at or above a predetermined threshold level.

In an additional embodiment a power supply comprises a transforming element coupled to receive a first power level and a regulation circuit coupled between the transforming element and a source of the first power level. The regulation circuit prevents the transforming element from receiving the first power level when a current or voltage at the input of the transforming element is at or above a predetermined threshold level.

It is an object of an aspect of the present inventions to create a power supply that is accurately regulated with a minimum amount of time spent out of regulation.

It is another object of an aspect of the present inventions to create a power supply that is cost effective for low power solutions.

It is a further object of the present inventions to create a power supply that utilizes the minimum amount of components possible.

It is also an object of the present inventions to create a power supply that is low cost.

This and other objects and aspects of the present inventions are taught, depicted and described in the drawings and the description of the invention contained herein.

DETAILED DESCRIPTION

Figure 1:
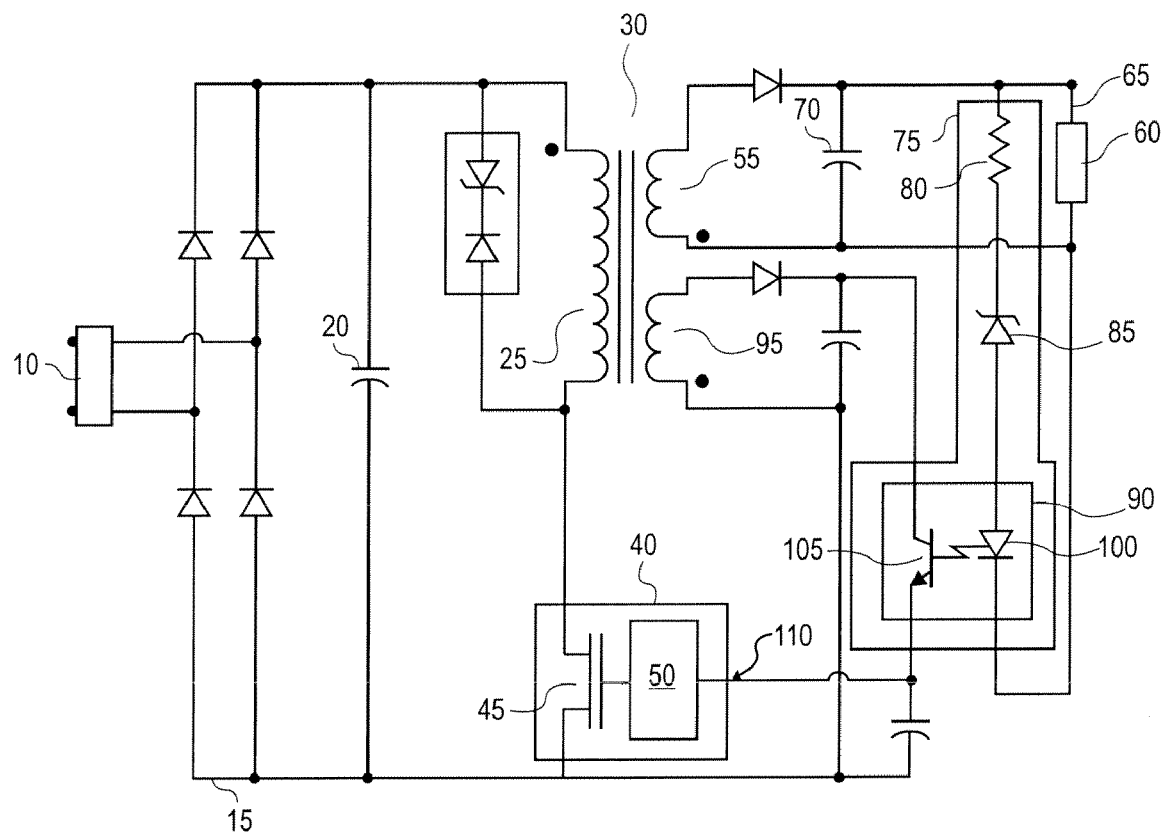
FIG. 1 depicts a known regulated power supply.
Figure 2:
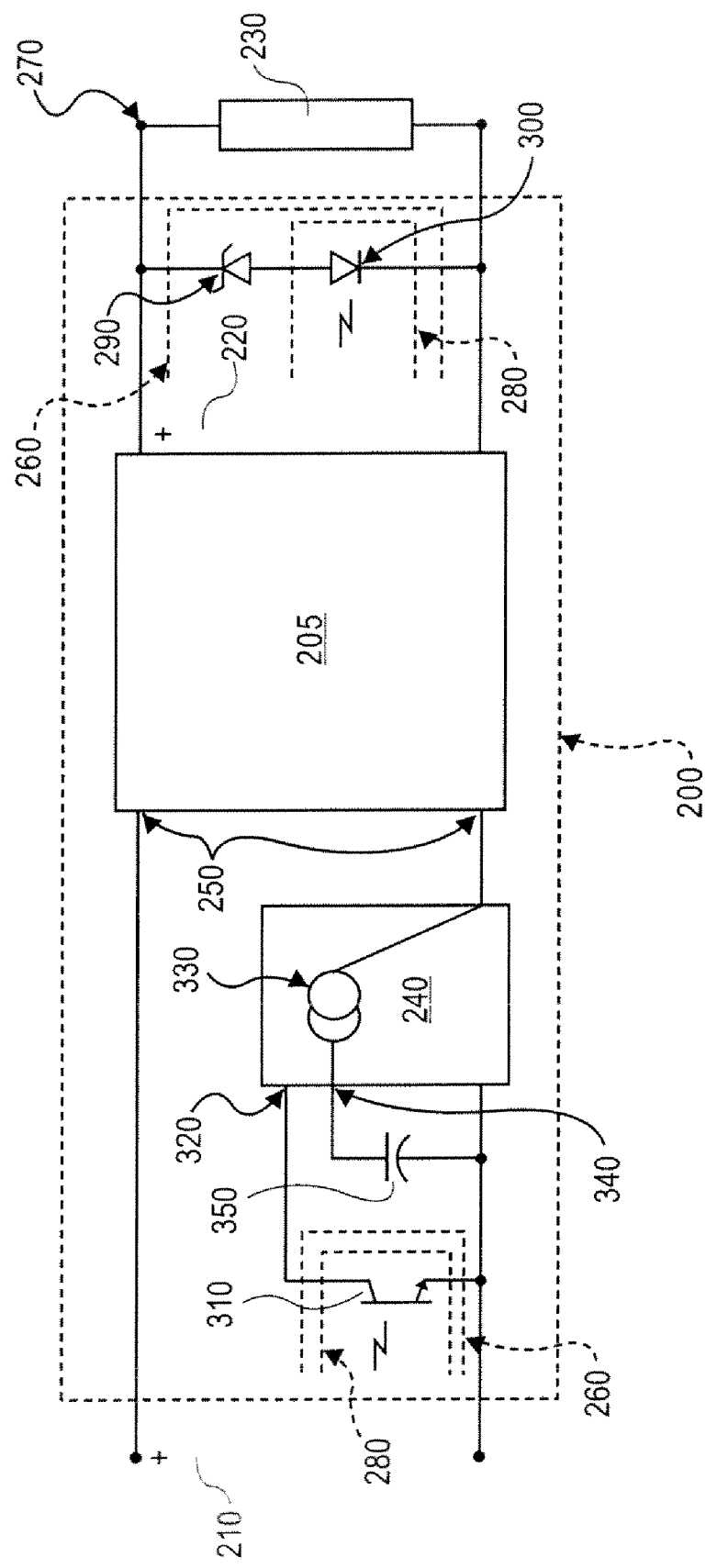
FIG. 2 is a presently preferred regulated DC to DC power supply according the present inventions.

Referring to FIG. 2, a DC to DC converter 200 receives a first DC voltage 210 having a first magnitude. The first DC voltage 210 is converted to a second DC voltage 220 that has a second magnitude by energy storage element 205. Although, the presently preferred DC to DC converter utilizes an energy storage element, other elements may be used by the present invention without departing from the scope and spirit of the present invention. For instance a transforming element, may be used as well. The second DC voltage 220 is provided to a load 230 to supply power to the load 230. It is presently preferred that the second voltage level is below the first voltage level and that DC to DC converter 200 is a step down converter. In operation the presently preferred regulation circuit 240 operates at fixed frequency, allowing current to be provided into the energy storage element input 250 for a same time period in-each cycle of the operating frequency. The output of feedback circuit 260 is utilized to enable or disable operation of the regulation circuit 240. The magnitude of second DC voltage 220 will vary depending on the ratio of the enable time to the disable time, i.e. the larger the ratio the greater the magnitude of second DC voltage 220.

To maintain second DC voltage 220 at a regulated level feedback circuit 260 is coupled to the positive terminal 270 of the load 230. A presently preferred feedback circuit 260 includes an optocoupler 280 and a zener diode 290. Feedback circuit 260 will trigger when the second DC voltage 220 is above a threshold level which is presently preferred to be a combination of the voltage drop across the light emitting diode 300 of optocoupler 280 (preferably one volt) and the reverse break down voltage of zener diode 290. Upon triggering feedback circuit 260 will activate phototransistor 310 of the optocoupler 280. The activation of phototransistor 310 causes a current to flow into the feedback terminal 320. The current input into feedback terminal 320 is utilized to disable regulation circuit 240. Disabling regulation circuit 240 prevents switching current at the operating frequency from flowing to energy storage element input 250 and prevents power from being supplied to the load 230. When regulation circuit 240 is not conducting a current source 330 is triggered within the regulation circuit 240. The current source 330 allows a small current to flow through a bypass terminal 340 of regulation circuit 240 to charge regulation circuit power supply bypass capacitor 350. Regulation circuit power supply bypass capacitor 350 is used to supply power to operate regulation circuit 240 when it is conducting. In this way when the second DC voltage 220 is above the desired threshold level virtually no power is supplied to the load and a minimum amount of power is being consumed by the DC to DC converter 200.

It is presently preferred that at the moment when second DC voltage 220 reaches a level below the threshold level, phototransistor 310 will cease conducting. When the phototransistor 310 is not conducting, no current flows into feedback terminal 320 and regulation circuit 240 is enabled. When the regulation circuit 240 is enabled a switching current at the operating frequency is supplied to the energy storage element input 250.

Figure 3:
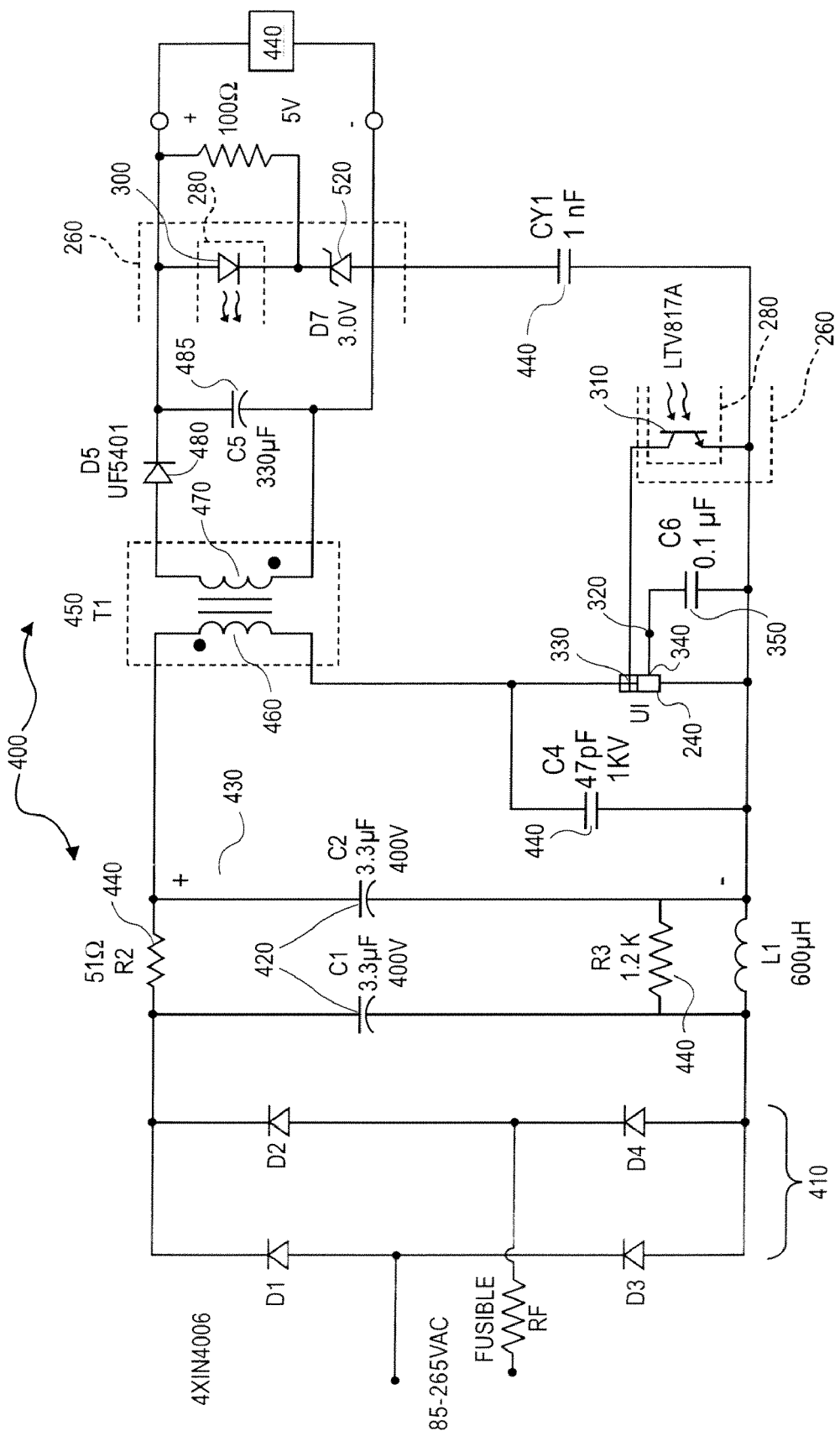
FIG. 3 is a presently preferred power supply according to the present inventions.

It is presently preferred, that the threshold level is equal to the regulated value of the output voltage, e.g. the second DC voltage 220. Alternatively, the output current can also be regulated by utilizing a current threshold. Referring to FIG. 3, a power supply 400 comprises a bridge rectifier 410 that rectifies an input AC mains voltage. Power supply capacitors 420 charge with the rectified AC mains voltage to maintain an input DC voltage 430. A presently preferred range for input DC voltage 430 is approximately one hundred (100) to four hundred (400) volts to allow for operation based upon worldwide mains voltages which range between eighty five (85) and two hundred sixty five (265) volts. The presently preferred power supply 400 also includes harmonic filter components 440 which in combination with capacitors 420 reduce the harmonic current injected back into the power grid. Transformer 450 includes a primary winding 460 magnetically coupled to secondary winding 470. The secondary winding 470 is coupled to a diode 480 that is designed to prevent current flow in the secondary winding 470 when the regulation circuit 240 is conducting (on-state). A capacitor 485 is coupled to the diode in order to maintain a continuous voltage on a load 490 which has a feedback circuit 260 coupled to it. A presently preferred feedback circuit 260 comprises an optocoupler 280 and zener diode 520. The output of optocoupler 280 is coupled to the feedback terminal 320 of regulation circuit 240. The presently preferred regulation circuit 240 switches on and off at a duty cycle that is constant at a given input DC voltage 430. A regulation circuit power supply bypass capacitor 350 is coupled to and supplies power to regulation circuit 240 when the regulation circuit 240 is in the on-state.

Operation of the power supply 400 will now be described. An AC mains voltage is input into bridge rectifier 410 which provides a rectified signal to power supply capacitors 420 that provide input DC voltage 430 to primary winding 460. Regulation circuit 240, which preferably operates at a constant frequency and about constant duty cycle at a given input DC voltage 430, allows current to flow through primary winding 460 during its on state of each switching cycle and acts as open circuit when in its off state. When current flows through primary winding 460 transformer 450 is storing energy, when no current is flowing through primary winding 460 any energy stored in transformer 450 is delivered to secondary winding 470. Secondary winding 470 provides then provides the energy to capacitor 485. Capacitor 485 delivers power to the load 490. The voltage across the load 490 will vary depending on the amount of energy stored in the transformer 450 in each switching cycle which is turn dependent on the length of time current is flowing through primary winding 460 in each switching cycle which is presently preferred to be constant at a given input DC voltage 430. The presently preferred regulation circuit 240 allows the voltage delivered to the load to be maintained at a constant level.

It is presently preferred that the sum of the voltage drop across optocoupler 280 and the reverse break down voltage of zener diode 520 is approximately equal to the desired threshold level. When the voltage across the load 490 reaches the threshold level, current begins to flow through the optocoupler 280 and zener diode 520 that in turn is used to disable the regulation circuit 240. Whenever regulation circuit 240 is in the off-state the regulation circuit power supply bypass capacitor 350 is charged to the operating supply voltage, which is presently preferred to be five point seven (5.7) volts by allowing a small current to flow from bypass terminal 340 to the regulation circuit power supply bypass capacitor 350. Regulation circuit power supply bypass capacitor 350 is used to supply power to operate regulation circuit 240 when it is in the on-state.

When the regulation circuit 240 is disabled, an open circuit condition is created in primary winding 460 and transformer 450 does not store energy. The energy stored in the transformer 450 from the last cycle of regulation circuit 240 is then delivered to secondary winding 470 which in turn supplies power to the load 490. Once the remaining energy in transformer 450 is delivered to the load 490 the voltage of the load 490 will decrease. When the voltage at the load 490 decreases below the threshold level, current ceases to flow through optocoupler 280 and regulation circuit 240 resumes operation either instantaneously or nearly instantaneously.

The presently preferred regulation circuit 240 has a current limit feature. The current limit turns off the regulation circuit 240, when the current flowing through the regulation circuit 240 rises above a current threshold level. In this way regulation circuit 240 can react quickly to changes such as AC ripple that occur in the rectified AC mains voltage, and prevents the propagation of the voltage changes to the load. The current limit increases the responsiveness of the regulation circuit to input voltage changes and delivers constant power output independent for the AC mains input voltage.

Although the presently preferred power supplies of FIGS. 2 & 3 utilize current mode regulation and a feedback circuit that includes an optocoupler and zener diode, the present invention is not to be construed as to be limited to such a feedback method or circuit. Either current or voltage mode regulation may be utilized by the present invention without departing from the spirit and scope of the present invention so long as a signal indicative of the power supplied to the load is supplied to the feedback terminal 320 of the regulation circuit 240. Additionally, although the presently preferred power supplies both utilize an optocoupler and zener diode as part of feedback circuits other feedback circuits may be utilized by the present invention without departing from the spirit and scope of the present invention.

Advantages associated with the power supplies depicted in FIGS. 2 and 3 include a "digital" on and off for the power supply making the regulation of the power supply extremely fast. Further, unlike known pulse width modulated regulated power supplies, no compensation of the regulation loop is required. Additionally, in known analog pulse width modulated control the bandwidth, which is usually one to two kilohertz, is less than its switching frequency. The bandwidth of the presently preferred regulation circuit 240 is capable of operating at its switching frequency. The presently preferred switching frequency is between forty (40) and fifty (50) kilohertz. Also, since there is no compensation loop or bias winding the cost of the power supply is reduced below the cost of known pulse width modulation regulated power supplies and 50/60 Hz transformers utilized in linear regulation solutions Referring to FIG. 4, a presently preferred low power supply 600 produces an output power preferably ranging between zero (0) and one (1) watt, but can also be used with higher power levels without departing from the scope and spirit of the present invention. Bridge rectifier 610 Us receives the AC mains voltage. Power supply capacitors 615 take the rectified voltage and then generate a DC voltage 620 that is supplied to primary winding 630 of transformer 640 and is then supplied to secondary winding 650. The secondary winding 650 provides power to capacitor 660 that supplies power to load 670. Load 670 has a zener diode 680 coupled in parallel with it. A regulation circuit 240 is coupled in series with primary winding 630, so that when regulation circuit 240 is conducting, on-state, current flows through primary winding 630 and when regulation circuit 240 is not conducting, off-state, current does not flow through primary winding 630. In the on-state power is supplied to regulation circuit 240 by regulation circuit power supply bypass capacitor 350.

Figure 4:
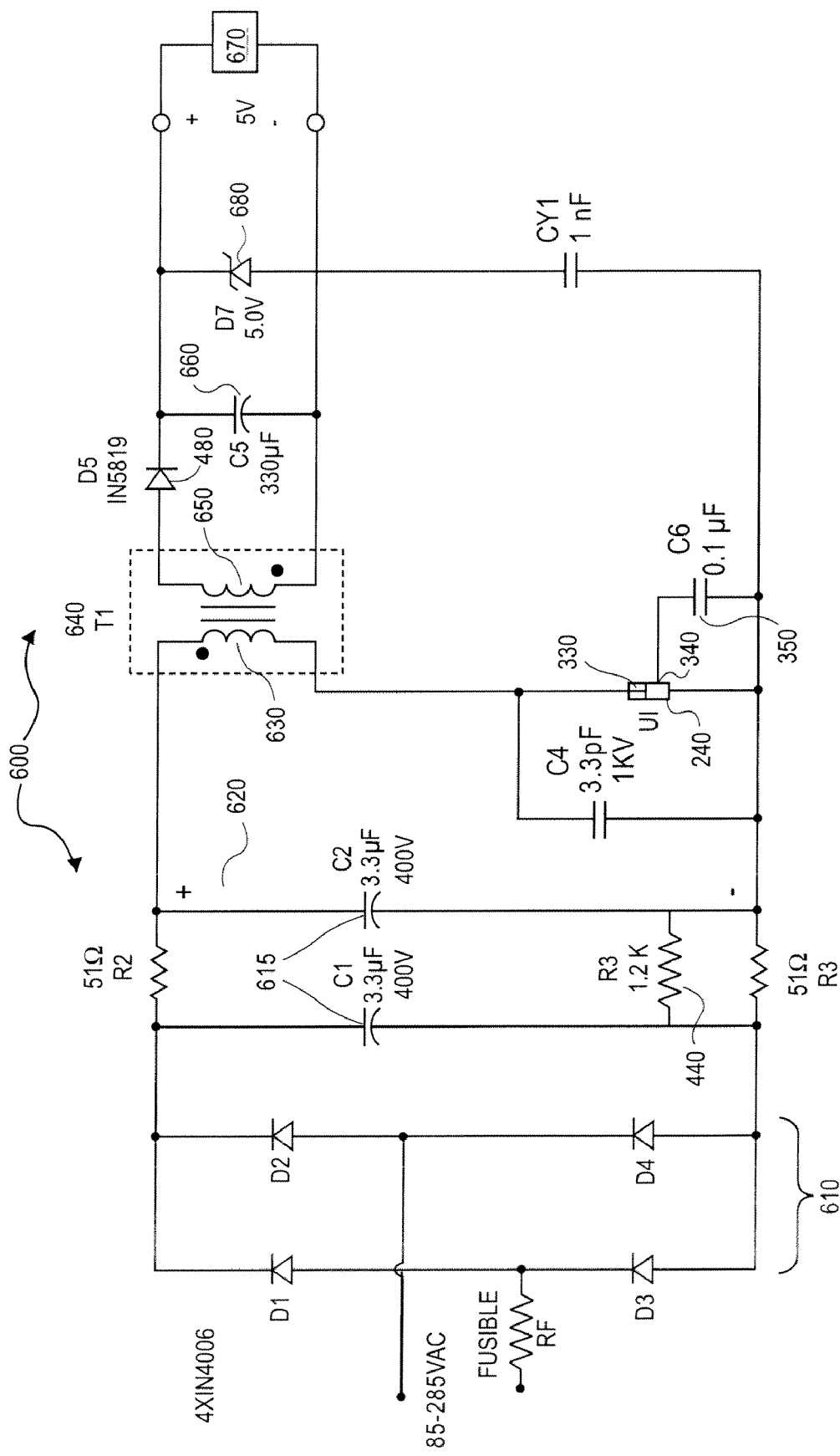
FIG. 4 is an alternate presently preferred power supply according to the present inventions.

Operation of the low power supply 600 of FIG. 4 will now be described. The AC mains voltage input into bridge rectifier 610 is rectified and the rectified voltage is supplied to power supply capacitors 615 that provide DC voltage 620. The DC voltage 620 is then provided to primary winding 630 that is in series with regulation circuit 240. Regulation circuit 240 preferably operates at a peak current limited duty cycle at a constant frequency and delivers power to the primary winding 630. At the beginning of each cycle when regulation circuit 240 is in the on-state the current through it ramps up at a rate determined by the inductance of primary winding 630 and the input DC voltage 620. When the current reaches the current limit regulation circuit 240 goes into the off-state. When current flows through the primary winding 630 energy is stored by transformer 640 and when no current flows through primary winding 630 energy is delivered to load 670. A constant power is delivered by the secondary winding 640 to the zener diode 680 and the load 670. As long as the load 670 consumes less power than delivered by the secondary winding 640 at the zener diode 680 reverse break down voltage, part of the power is consumed by the zener diode 680 and the output voltage is regulated at the reverse break down voltage.

Figure 5:
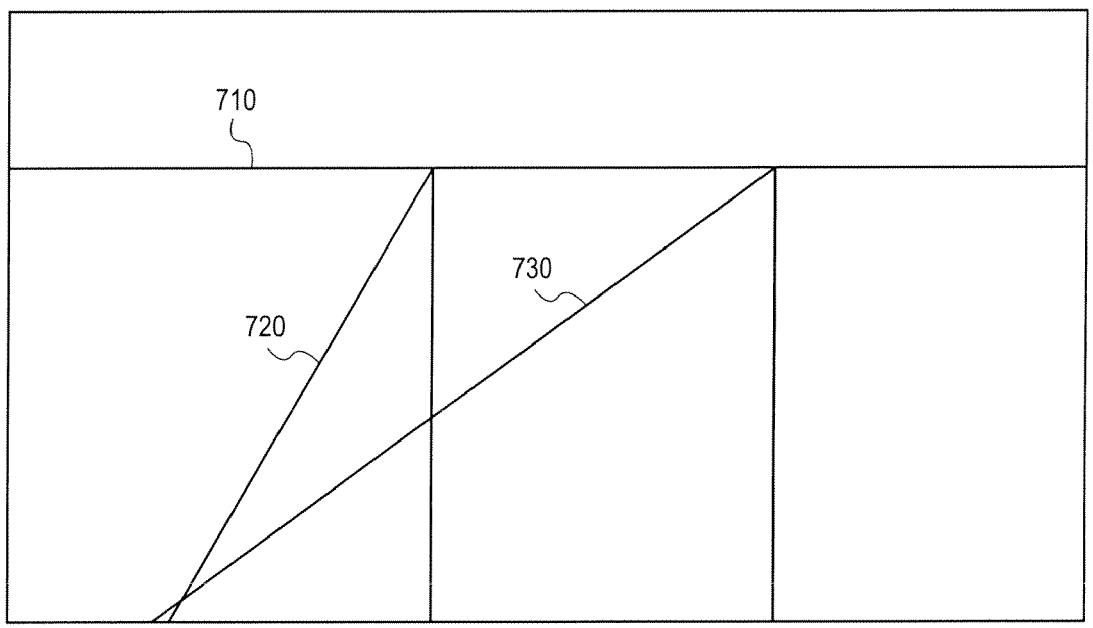
FIG. 5 is a diagram of the presently preferred regulator circuit switch current presently preferred power supplies of FIGS. 2, 3 or 4 according to the present inventions.

Referring to FIG. 5, a current limit 710 (I) is designed into the regulation circuit 240 for faster response. The current flowing through primary winding 460 or 630 will rise to the level of current limit 710 and then cease to flow. A high input voltage current 720 rises at a first rate, while a low input voltage current 730 rises at a second rate. The second rate is lower than first rate, but both currents reach the current threshold limit 710 (I) although at different times. The rate of rise of the current is a function of the inductance of primary winding (L) and magnitude of the input voltage. The power supplied to the load is proportional to the area under the curves of the current multiplied by the input voltage, which is constant. Since the primary winding current is limited at the current limit 710 (I) the power supplied to the load, can be expressed as in Equation 1 below:

Based upon Equation 1 the power supplied to the primary winding by high input voltage current 720 and low input voltage current 730 will be the same, assuming the same regulation circuit 240 is operating with the same current threshold limit 710 and at the same frequency (.function.). This is true regardless of the rate of rise of the primary winding current. This means that the power supplied to the load in the power supply of FIG. 3 or FIG. 4 will be constant and independent of the DC input voltage 430 or 620. This means that the power supplied to the load is independent of the AC Mains voltage. Thus, a constant power is delivered utilizing the presently preferred ted regulation circuit 240

The power supplied to the load is a function of the current limit 710 (I), frequency of operation (.function.) and the inductance of the primary winding (L). Since the inductance of the primary winding and current limit are determined by the circuit designer in designing the power supply, the designer can design in the power delivered to the load easily and effectively by utilizing the presently preferred regulation circuit 240.

It should be noted that the above discussion assumes, as is presently preferred, that the inductance of the primary winding is chosen such that the all of the energy input into the transformer is delivered in each cycle of operation. As a result, the presently preferred primary winding current begins at zero at the start of each cycle of operation. However, the present invention will still deliver power if the inductance of the primary winding is chosen such that not all of the energy input into the transformer is delivered in each cycle of operation and the primary winding current begins at a non-zero value at the start of each cycle of operation.

Figure 6:
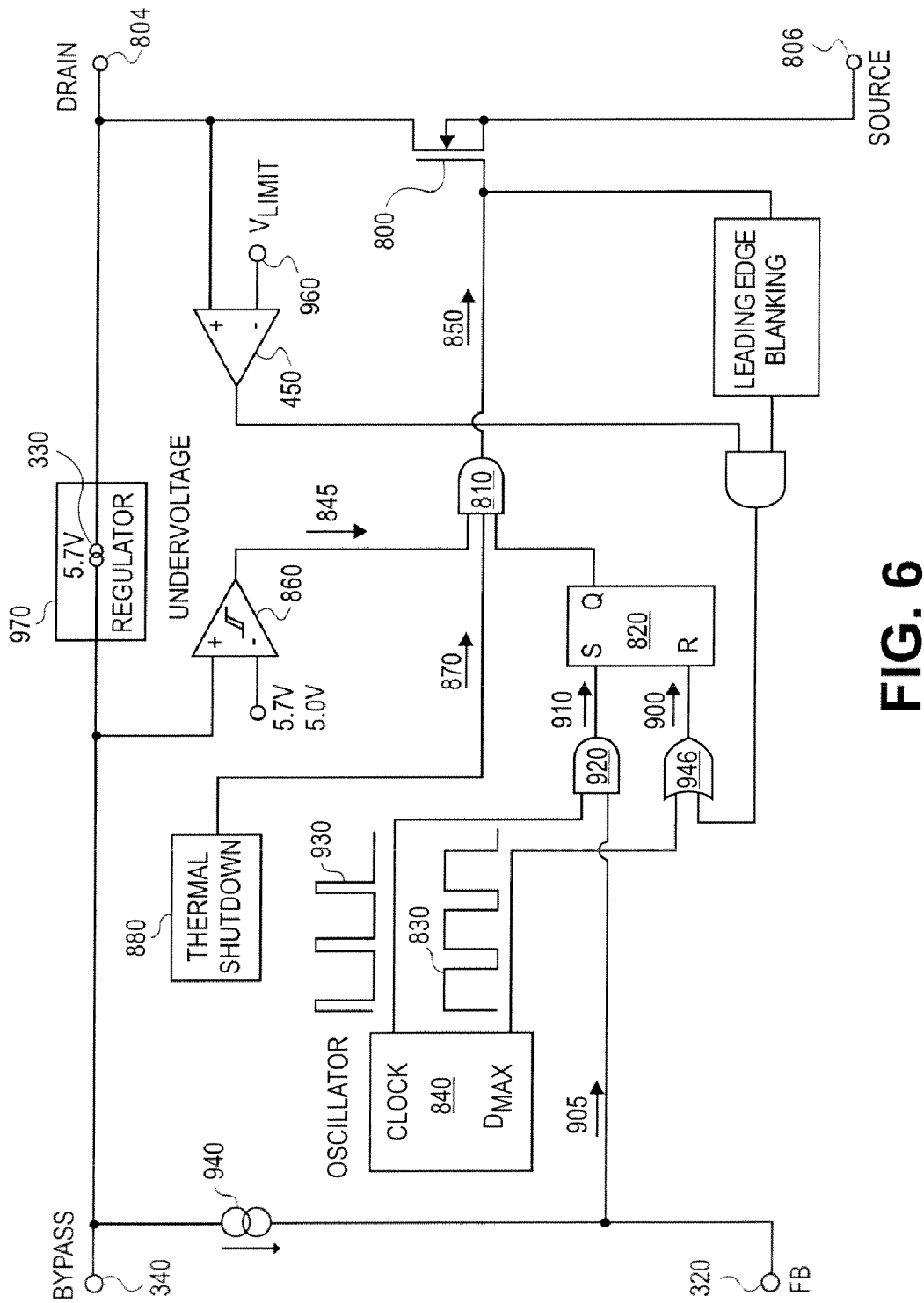
FIG. 6 is a functional block diagram of a presently preferred power supply regulation circuit according to the present inventions.

Referring to FIG. 6, a presently preferred regulation circuit 240 comprises a MOSFET 800 that is coupled between a drain terminal 804 and a source terminal 806. MOSFET 800 is switched on and off according to a drive signal 850 input into its gate by first and-gate 810. The input of first and-gate 810 comprises an output of first latch 820, a bypass terminal voltage indicator signal 845 provided by undervoltage comparator 860, and a thermal status signal 870 from thermal shut down circuit 880. Maximum duty cycle signal 830 determines the maximum time that MOSFET 800 can conduct in each cycle of operation.

Thermal shut down circuit 880 monitors the temperature of the primary winding by monitoring the temperature of regulation circuit 240 and provides the thermal status signal 870 as long as the temperature is below a threshold temperature. It is presently preferred that the threshold temperature is 135 degrees Celsius.

The inputs to latch 820 include an or-gate output signal 900 and and-gate output signal 910. The and-gate output signal is provided when no phototransistor 310 current is provided to feedback input 320. Feedback gate 920 provides output when enable signal 905 is received and clock signal 930 is provided by oscillator 840. Additionally, first current source 940 will pull enable signal 905 to a logic high state when the current present in the phototransistor 310 is less than the current source 940 current. In operation when enable signal 905 is high, the clock signal 930 is transferred to latch 820 by the and-gate 920, thereby setting the latch 820 and enabling that cycle to go through and turn on the MOSFET 800. Conversely, when the enable signal 905 is low, it blocks the clock signal from setting the latch 820, and keeps the MOSFET 800 off during that cycle.

Or-gate output signal 900 is provided by or-gate 945 when the current threshold limit 710 is reached or during the time when maximum duty cycle signal 830 is in an off state. In operation or-gate output signal 900 will be provided when the maximum duty cycle signal is off or when the current limit 710 is reached in order to turn off the MOSFET 800.

Current threshold limit monitoring is performed by current threshold comparator 950 that compares the voltage level across the MOSFET 800 on-resistance, if that voltage is above the current threshold limit voltage 960 the current limit signal is triggered and the MOSFET 800 is turned off and then will not begin conducting until the beginning of the next on-time when no current limit signal is provided.

In this way the presently preferred regulator circuit 240 turns off the MOSFET 800 after the current on cycle when the phototransistor 310 pulls the enable signal 905 low and creates a condition where there will be no additional power supplied to the load. When the phototransistor 310 current falls below the first current source 940 current, enable signal 905 is high due to the operation of current source 940 and MOSFET 800 will resume operation upon the beginning of the next on-period of the maximum duty cycle signal 830.

Bypass circuit 970, which includes current source 330, regulates the power level of regulation circuit power supply bypass capacitor 350 at a voltage level which is presently preferred to be five point seven (5.7) volts. This is done by charging the regulation circuit power supply bypass capacitor 350 when the MOSFET 800 is not conducting. Undervoltage circuit 860 prevent the MOSFET 800 from conducting again until the voltage at bypass terminal 340 reaches the desired voltage level.

Figure 7:
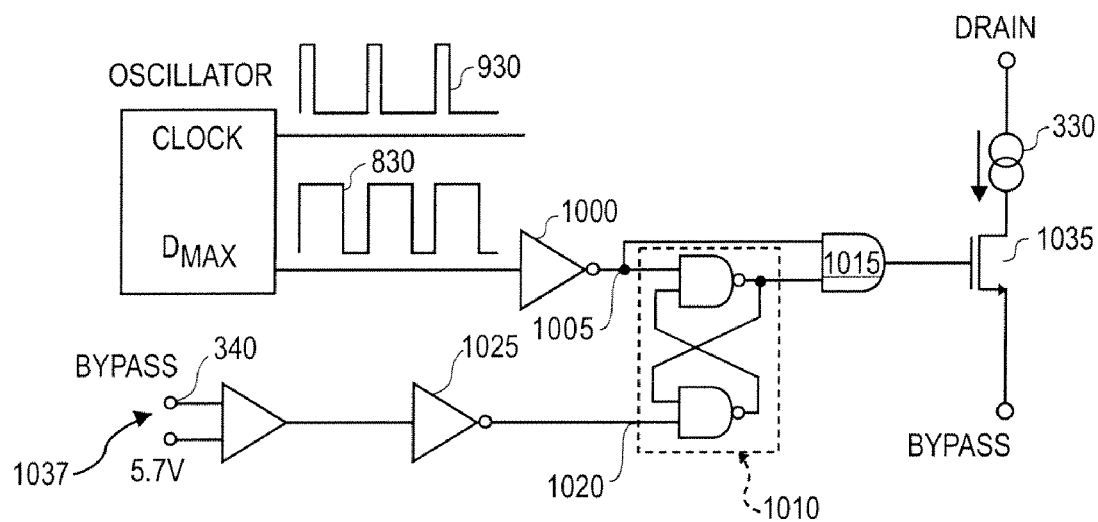
FIG. 7 is a block diagram of a presently preferred bypass voltage regulation circuit according to the present inventions.

Referring to FIG. 7, maximum duty cycle signal 830 is provided to first inverter 1000 the output of which is provided to a first terminal 1005 of bypass latch 1010 and to bypass and-gate 1015. The output of bypass latch 1010 is provided to bypass and-gate 1015. The second input terminal 1020 of bypass latch 1010 receives the output of second bypass inverter 1025 that receives input from bypass comparator 1030. Bypass comparator 1030 determines whether the voltage at bypass terminal 340 has reached the voltage level for terminating input to the regulation circuit power supply bypass capacitor 350. A bypass MOSFET 1035 conducts or interdicts depending on the output of bypass and-gate 1015. When the bypass MOSFET 1035 conducts current source 330 allows current to flow bypass terminal 340 and allows the regulation circuit power supply bypass capacitor 350 to charge.

In operation bypass latch 1010 is turned on when the maximum duty cycle signal 830 is high and MOSFET 800 is conducting. However, the output of bypass latch 1010 is blocked by bypass and-gate 1015 from turning on the current source 330 during this time. When the maximum duty cycle signal 830 goes low MOSFET 800 turns off and the bypass and-gate 1015 will no longer block the output of bypass latch 1010 from turning on current source 330. When the current source 330 is turned on, it charges the regulation circuit power supply bypass capacitor 350. When the bypass terminal voltage 1037 at the bypass terminal 340 reaches the voltage threshold level, which is presently preferred to be five point seven (5.7) volts, the bypass latch 1010 is reset by the output of bypass comparator 1030 and current source 330 is turned off. In this way bypass MOSFET 1035 will conduct only when the maximum duty cycle signal 830 is low and regulation circuit power supply capacitor 350 will charge only when the MOSFET 800 is not conducting.

Figure 8:
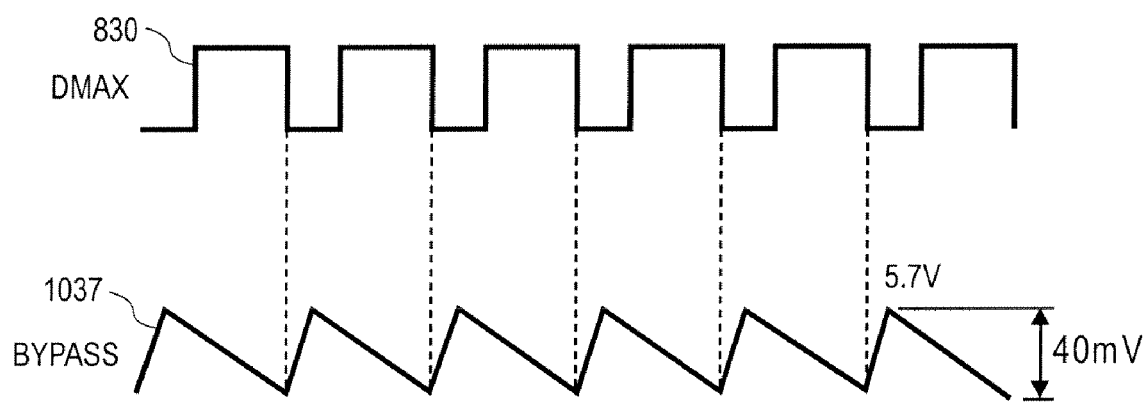
FIG. 8 is a diagram of the presently preferred bypass terminal voltage and maximum duty cycle signal according to the present inventions.

Referring to FIG. 8, the bypass terminal voltage 1037 will decrease while the maximum duty cycle signal 830 is high. When the maximum duty cycle signal 830 goes low, the current source 330 is activated and the regulation circuit power supply bypass capacitor 350 is charged which in turn increases the bypass terminal voltage 1037. It is presently preferred, that the bypass terminal voltage 1037 reaches the voltage threshold prior to when the maximum duty cycle signal 830 goes high. Once the voltage threshold is reached, the bypass latch 1010 is reset and the bypass MOSFET 1035 ceases to conduct the regulation circuit power supply bypass capacitor 350 will discharge until the next low period of maximum duty cycle signal 830.

Figure 9:
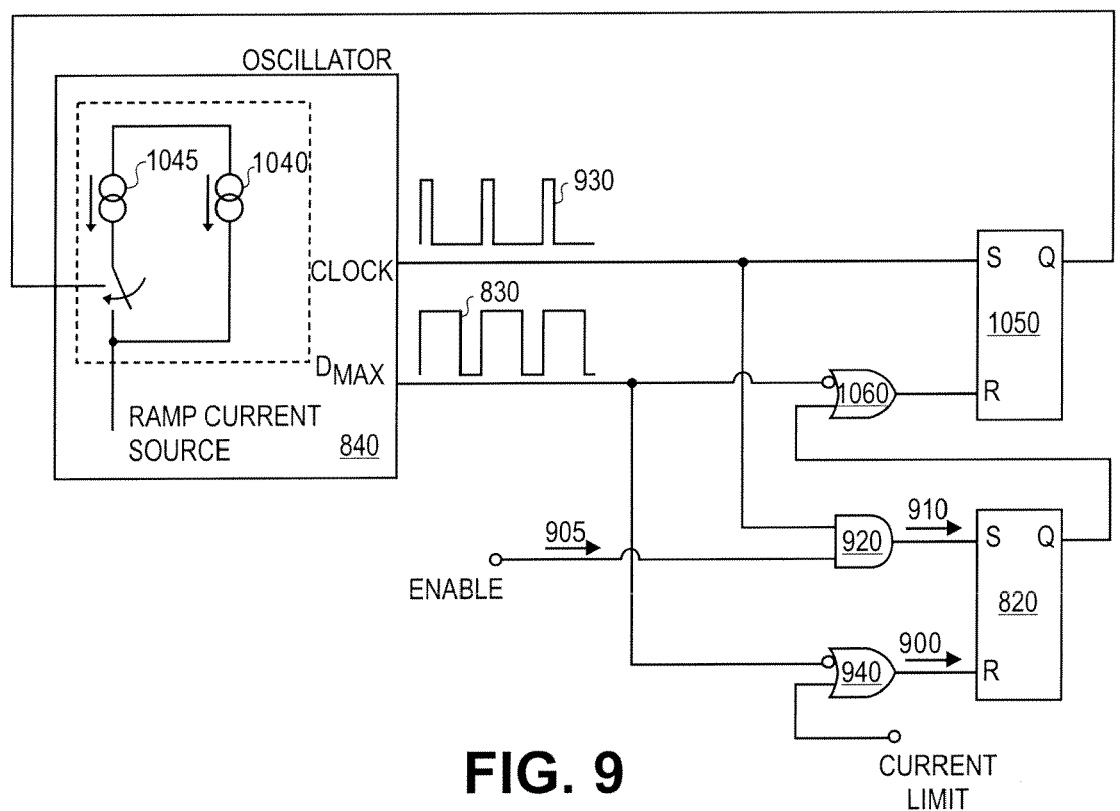
FIG. 9 is a block diagram of a presently preferred circuit allowing for increasing the clock frequency of the oscillator according to the present inventions.

Referring to FIG. 9, normal oscillator current source 1040 provides a current to oscillator 840 when the oscillator is outputting the maximum duty cycle signal 830. A presently preferred speed-up current source 1045 provides a current that has a greater magnitude than the current provided by the oscillator current source 1040. When both the speed-up current source 1045 and the oscillator current source 1040 provide current to drive oscillator 840 the clock frequency is increased. Speed-up latch 1050 is set at the beginning of each clock cycle. When speed-up latch 1050 is set, the speed-up switch 1055 is allowed to conduct allowing current from speed-up current source 1045 to increase the clock frequency of oscillator 840. A speed-up or-gate 1060 will reset speed-up latch 1050 when the maximum duty cycle signal 830 is low or when the latch 820 is set. It should be noted that latch 820 is set when the enable signal 905 is high. Therefore, in those cycles when enable signal 905 is high and MOSFET 800 conducts the speed-up latch 1010 is reset immediately at the beginning of that cycle and the clock frequency of the oscillator is normal with only oscillator current source 1040 providing current. In those cycles when enable signal 905 is low and MOSFET 800 is not conducting, the speed-up latch 1010 is not reset until maximum duty cycle signal 830 is low and the oscillator 840 operates at the predetermined higher frequency by the addition of the speed-up current source 1045.

Figure 10:
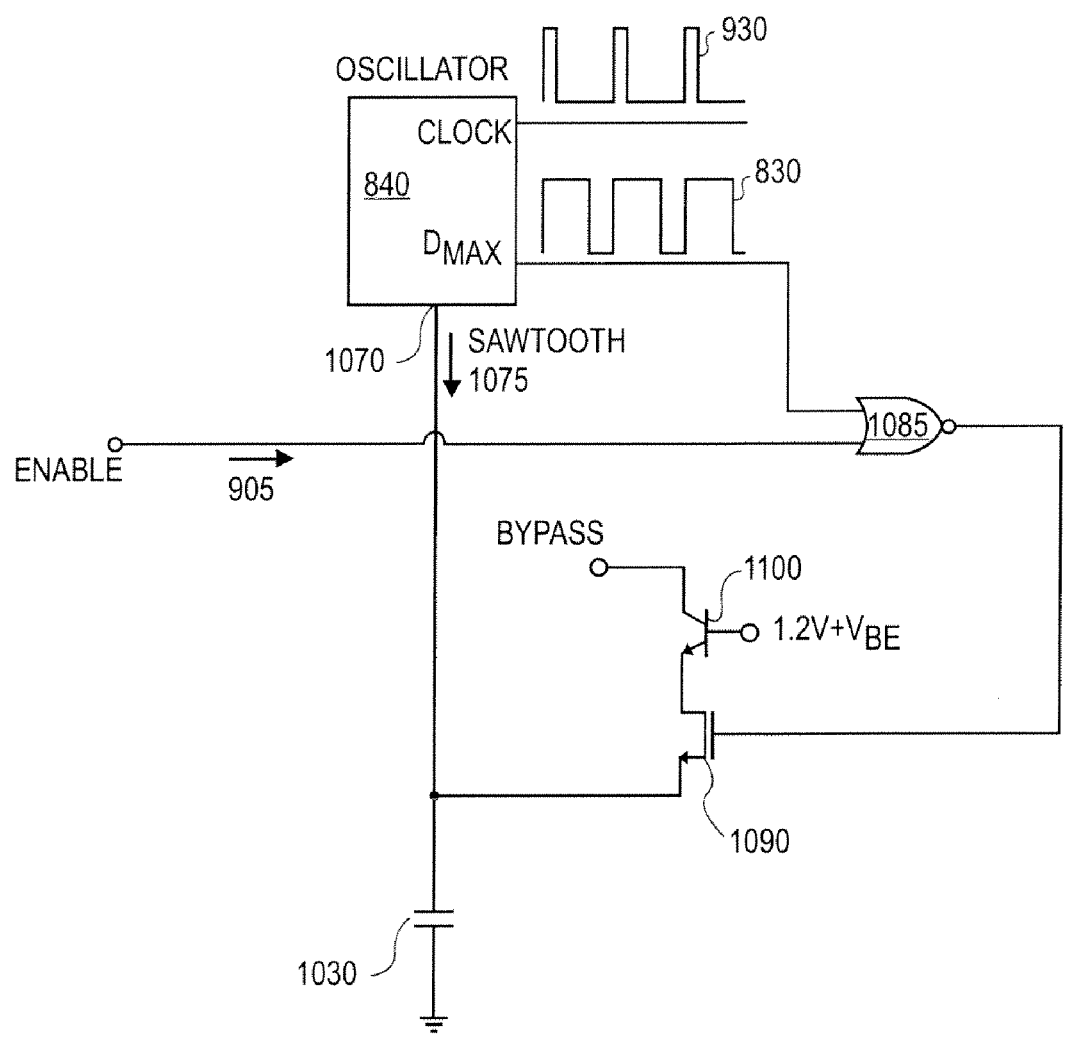
FIG. 10 is a block diagram of a presently preferred circuit allowing for stoppage of the oscillator according to the present inventions.

Referring to FIG. 10, oscillator 840 includes a saw tooth output 1070 that provides a saw tooth waveform 1075. The saw tooth waveform 1075 is the voltage across saw tooth capacitor 1080 that charges and discharges within each cycle. A disable nor-gate 1085 is provided with the enable signal 905 and the maximum duty cycle signal 830. Disable nor-gate 1085 will provide an output when the enable signal 905 is low and the duty cycle signal 830 is low. The output of disable nor-gate 1085 is provided to clamp switch 1090 allowing the clamp switch 1090 to conduct and clamp the saw tooth waveform. 1075 to a voltage level between its high and low peaks during its falling edge. The presently preferred clamp switch 1090 is a MOSFET. When the clamp switch 1090 conducts a current flows from the bypass terminal 340 through biasing transistor 1100 and clamp switch 1090 to clamp the voltage level of saw tooth capacitor 1080. The voltage across saw tooth capacitor 1080 is then clamped to a fixed value and the oscillator 840 ceases to function. In this way, oscillator 840 ceases to function when the load voltage is above the threshold level and the regulation circuit 240 is disabled.

Figure 11:
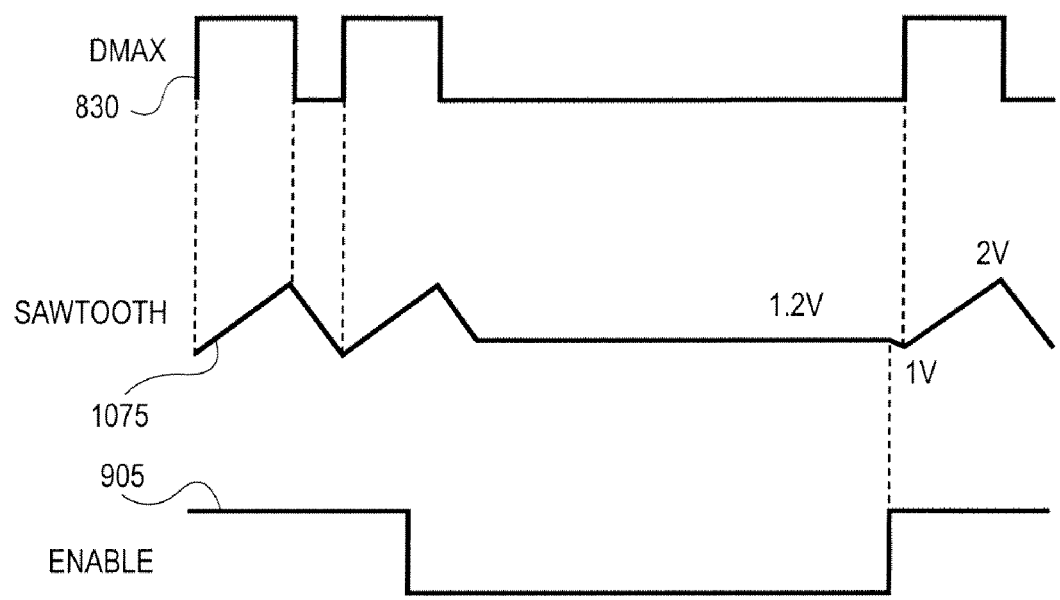
FIG. 11 is a diagram of the presently preferred enable signal and the saw tooth waveform according to the present inventions.

Referring to FIG. 11, saw tooth waveform 1075 oscillates between a higher voltage level and a lower voltage level. The presently preferred higher voltage level is two (2) volts and the presently preferred lower voltage level is one (1) volt. Once the enable signal 905 is removed, and the saw tooth waveform 1075 reaches the clamp voltage of saw tooth capacitor 1080 the saw tooth waveform 1075 is maintained at that clamp voltage. Once the enable signal 905 is provided again, the clamp switch 1090 no longer conducts and the saw tooth waveform 1075 continues its cycle. Once the saw toothed waveform 1075 reaches the lower voltage level at resume time 1125 another clock cycle begins and oscillator 840 resumes operation.

It is presently preferred that regulation circuit 240 comprises a monolithic device.

Figure 12:
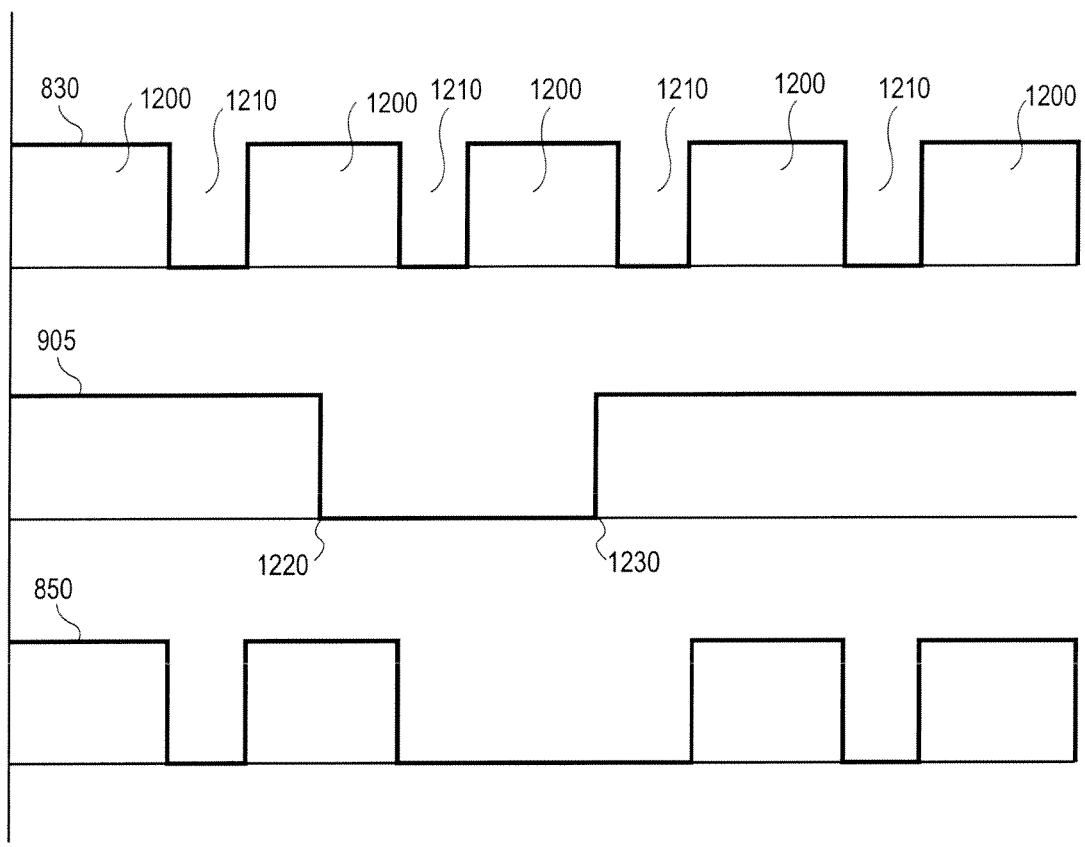
FIG. 12 is a diagram of the signals generated in a presently preferred mode of operation within the presently preferred power supply regulation circuit of FIG. 7 according the present inventions.

Referring to FIG. 12, maximum duty cycle signal 830 has an on-time 1200 and off-time 1210. Enable signal 905 is provided and then stops at time 1220 when feedback from phototransistor 310 is received. When the enable signal 905 is terminated, drive signal 850 is maintained on for the remainder of on-time 1200. Once the on time 1200 is completed drive signal is disabled. At time 1230, which is during on-time 1200 enable signal 905 is provided again because feedback from phototransistor 310 is no longer received. The drive signal 850 will not be provided again until the beginning of the next on-time 1200 of the maximum duty cycle signal 830.

Figure 13:
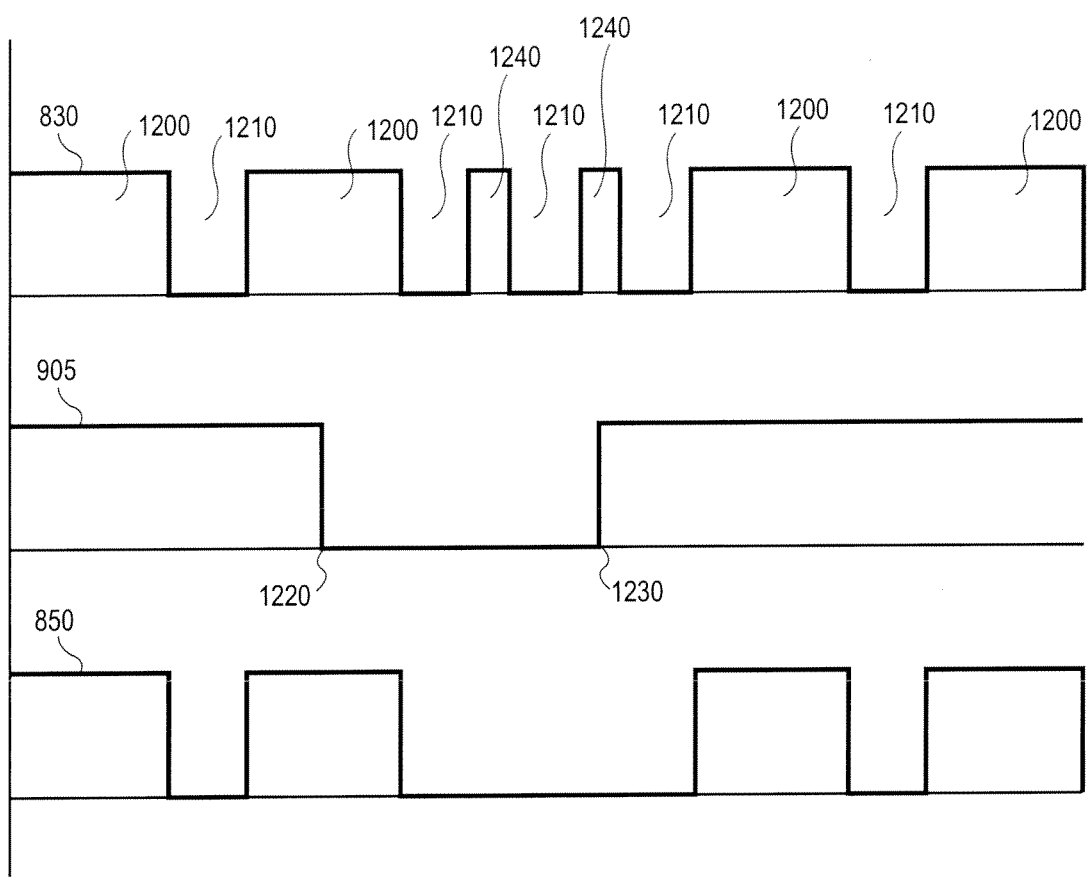
FIG. 13 is a diagram of the signals generated in a presently preferred mode of operation within the presently preferred power supply regulation circuit of FIG. 9 according the present inventions.

Referring to FIG. 13, in the alternate approach depicted in FIG. 9, maximum duty cycle signal 830 includes on-time 1200 and off-time 1210 while the enable signal 905 is received. Also, during the on-time 1200 drive signal 850 is provided. When the enable signal 905 is terminated, drive signal 850 is maintained on for the remainder of on-time 1200. Once the enable signal 905 is discontinued, it is presently preferred that the oscillator 840 speeds up to a higher frequency by having a shortened on-time 1240 while maintaining the same length off-time 1210. When the enable signal 905 is provided again, MOSFET 800 resumes operation in approximately half the time compared to the embodiment of FIG. 12. The drive signal 850 will not be provided again until the beginning of the next on-time 1200 of the maximum duty cycle signal 830. This approach may have some advantages in certain applications as it minimizes the response time of the regulation circuit 240. The shorter response time decreases of the voltage ripple at the load.

Figure 14:
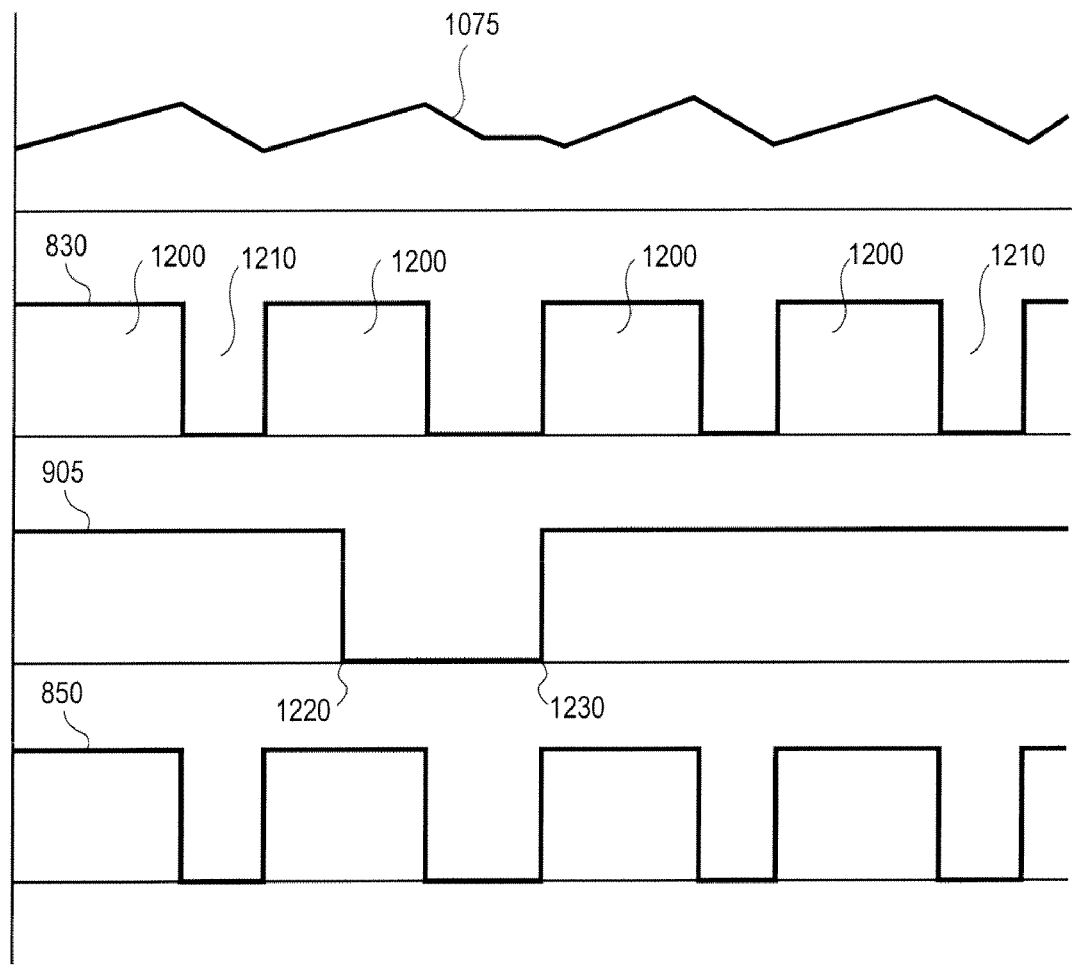
FIG. 14 is a diagram of the signals generated in an alternate preferred mode of operation within the presently preferred power supply regulation circuit of FIG. 10 according the present inventions.

Referring to FIG. 14, in the approach depicted in FIG. 10, maximum duty cycle signal 830 includes on-time 1200 and off-time 1210 while the enable signal 905 is received. Also, during the on-time 1200 drive signal 850 is provided. When the enable signal 905 is terminated, drive signal 850 is maintained on for the remainder of on-time 1200. Once the enable signal 905 is discontinued, oscillator 840 ceases functioning. The drive signal 850 will not be provided again until the beginning of the next on-time 1200 of the maximum duty cycle signal 830, which will be immediately upon receiving the enable signal 905. Like the embodiment of FIG. 13 this approach has the advantage of minimizing the response time of the regulation circuit 240 The shorter response time decreases of the voltage ripple at the load.

While the embodiments, applications and advantages of the present invention have been depicted and described, there are many more embodiments, applications and advantages possible without deviating from the spirit of the inventive concepts described herein. Thus, the inventions are not to be restricted to the preferred embodiments, specification or drawings. The protection to be afforded this patent should therefore only be restricted in accordance with the spirit and intended scope of the following claims.

What is claimed is:

1. A regulation circuit for use in a DC to DC converter, comprising:
   a feedback circuit to be coupled an energy transfer element output to receive a feedback signal to indicate whether the energy transfer element output is above or below a threshold level; and
   a control circuit to be coupled to a switch coupled to an energy transfer element input, the control circuit further coupled to the feedback circuit to generate a drive signal to control the switch to regulate the energy transfer element output to approximately the threshold level, the control circuit to maintain an on-time of a current cycle of the drive signal and not allow an on-time of a next cycle of the drive signal in response to the energy transfer element output rising above the threshold level.

2. The regulation circuit of claim 1 further comprising an oscillator coupled to provide an oscillating signal coupled to control circuit, the oscillating signal to oscillate at a first frequency under a first set of conditions and at a second frequency under a second set of conditions, the control circuit to generate the drive signal in response to the feedback signal and the oscillating signal.

3. The regulation circuit of claim 2 wherein the oscillating signal does not oscillate under a third set of conditions.

4. The regulation circuit of claim 2 wherein one of the first and second frequencies is substantially zero.

5. The regulation circuit of claim 2 wherein the oscillator includes first and second current sources, the first current source to drive the oscillating signal under the first set of conditions and the first and second current sources to drive the oscillating signal under the second set of conditions.

6. The regulation circuit of claim 1 further comprising a current source coupled between a bypass terminal and the first terminal, wherein the bypass terminal is to be coupled to a capacitor.

7. The circuit of claim 1 wherein the control circuit includes a latch coupled to be set in response to the feedback signal and coupled to be reset in response to a duty cycle signal, wherein the drive signal is coupled to be generated in response to the latch.

* * * * *